(12) United States Patent
Kinoshita

(10) Patent No.: US 7,036,327 B1  
(45) Date of Patent: May 2, 2006

(54) COOLING SYSTEM AND COOLING METHOD

(76) Inventor: Mikio Kinoshita, 470-23-402, kudencho, Sakae-ku, Yokohama-shi, Kanagawa (JP), 247-0014

( * ) Notice: Subject to any disclaimer, the term of this patent is extended or adjusted under 35 U.S.C. 154(b) by 0 days.

(21) Appl. No.: 10/182,115

(22) PCT Filed: Feb. 1, 2000

(86) PCT No.: PCT/JP00/00540

§ 371 (c)(1),  
(2), (4) Date: Jul. 20, 2002

(87) PCT Pub. No.: WO01/57455

PCT Pub. Date: Aug. 9, 2001

(51) Int. Cl.  
*F25B 15/00* (2006.01)

(52) U.S. Cl. .......................... 62/112; 62/476
(58) Field of Classification Search ............. 62/101, 62/484, 485, 494, 112, 476, 480  
See application file for complete search history.

(56) References Cited

U.S. PATENT DOCUMENTS

| | | | | |
|---|---|---|---|---|
| 4,487,027 A | * | 12/1984 | Macriss | 62/112 |
| 4,754,805 A | * | 7/1988 | Rothmeyer | 165/1 |
| 5,463,879 A | * | 11/1995 | Jones | 62/480 |
| 5,477,706 A | * | 12/1995 | Kirol et al. | 62/480 |
| 5,723,058 A | * | 3/1998 | Schuurman | 252/69 |
| 6,158,238 A | * | 12/2000 | Lampinen et al. | 62/484 |

* cited by examiner

*Primary Examiner*—Melvin Jones

(57) ABSTRACT

A cooling system comprising an evaporation cooling device for evaporating an aqueous solution, a water content providing device for allowing vapor evaporated from impurities-containing water to be absorbed into the aqueous solution, and a circulating device for circulating the aqueous solution between the water content providing device and the evaporation cooling device; and a cooling method characterized by comprising the steps of taking in impurities-containing water, cooling a high-temperature body by evaporating water content in an aqueous solution having a boiling point higher than that of the impurities-containing water, allowing vapor evaporated from the impurities containing water to be absorbed into the aqueous solution concentrated by the cooling step, feeding the aqueous solution diluted in the absorbing step to the cooling step, and discharging the impurities-containing water concentrated in the absorbing step. The aqueous solution circulates between the water content providing device and the aqueous solution desalination device, and no salts move between the aqueous solution and the impurities-containing water, thereby providing a cooling system free from scales.

32 Claims, 4 Drawing Sheets

COOLING SYSTEM AND COOLING METHOD

TECHNICAL FIELD

The present invention relates to a cooling system which utilizes evaporation latent heat of water and a cooling method.

BACKGROUND ART

Water has large evaporation latent heat, and is used for cooling by evaporation, for a distillation device, a generation system, a heat engine, or a cooling device. There have been a problem, however, such that scale originated from impurities contained in the water adheres to an evaporation part due to condensation of water, when the water containing the impurities is caused to be evaporated. Therefore, work for removing scale is required frequently. In particular, usage of seawater having the impurities that cause hard scale gives rise to problems in the cooling by evaporation.

The present invention is made in view of the above, an object of the present invention is to provide a novel cooling system and a cooling method, in which adhesion of scale accompanied by evaporation is reduced.

DISCLOSURE OF INVENTION

According to an embodiment of the present invention, a novel cooling system is provided, which includes an evaporation cooling device which evaporates aqueous solution having a higher boiling point than that of impurities-containing water, a water providing device which causes water vapor evaporated from the impurities-containing water to be absorbed in the aqueous solution, and a circulation device which circulates the aqueous solution between the water providing device and the evaporation cooling device.

As the impurities-containing water, water containing salts or organic materials which are the origin of scale-generation may be used, such as purified water, river water, lake water, groundwater, seawater, or waste water.

The aqueous solution is a kind of water having a molar elevation of boiling point higher than that of the impurities-containing water. The aqueous solution may include salts having large solubility, such as sodium chloride, sodium magnesium, sodium calcium, or the like, as solute.

A permeating member which permeates the aqueous solution may be provided on an evaporation surface where the aqueous solution evaporates. The cooling system may further include a sprinkler which sprinkles the evaporation surface with the aqueous solution.

The cooling system may further include a dust prevention device for preventing adhesion of dust of the air to the evaporation surface.

The cooling system may further include a device for enhancing evaporation of the aqueous solution, for example, a ventilator or a chimney.

With the above-mentioned evaporation of the aqueous solution, the aqueous solution is concentrated due to loss of water. The above-mentioned water providing device causes water vapor evaporated from the impurities-containing water to be absorbed in the aqueous solution. The aqueous solution which is concentrated is thereby replenished with water.

The water providing device may be an absorption heat pump which is supplied with the impurities-containing water and the aqueous solution. In this case, the cooling system may further include a heating device for operating the absorption heat pump in a high-temperature atmosphere. Alternatively, the cooling system may further include a vacuum device for operating absorption heat pump in a vacuum atmosphere.

In order to prevent adhesion of solid materials included in the impurities-containing water to the water providing device, a filtration device for removing the solid materials may be provided for the cooling system. Further, the cooling system may further include a water processing device which decomposes organic materials contained in the impurities-containing water.

When the cooling system further includes a distillation device having a condensation part, and distills saline water or the like, the evaporation cooling device is disposed at the condensation part. The distillation device may further include a heat-absorbing surface for absorbing thermal energy of the atmosphere. The distillation device may perform distillation, under supply of solar thermal energy.

When the cooling system further includes a steam power generating system having a condenser, and generates electricity, the evaporation cooling device is disposed at the condenser.

When the cooling system further includes an internal combustion engine, and generates power, the evaporation cooling device is disposed at the internal combustion engine.

When the cooling system includes an air conditioner having a high temperature heat source, the evaporation cooling device is disposed for cooling the high temperature heat source. When the water supply/drainage system is installed in a region crowded with the air conditioners, a heat-island phenomenon of the region is relaxed.

According to another embodiment of the present invention, a cooling method is provided, which includes the steps of, taking impurities-containing water, cooling a high-temperature body by evaporating water of an aqueous solution having a boiling point higher than that of the impurities-containing water, causing the water vapor evaporated from the impurities-containing water to be absorbed in the aqueous solution concentrated by the cooling step, sending the aqueous solution diluted by the absorption step to the cooling step, and draining the impurities-containing water concentrated by the absorption step.

The absorption step may be performed using an absorption heat pump which is supplied with the impurities-containing water and the aqueous solution. In order to operate the absorption heat pump at a high-temperature, the cooling method may further include a heating step for heating the impurities-containing water. Alternatively, the cooling method may further include a vacuum evacuating step for operating the absorption heat pump in a vacuum atmosphere.

The cooling method may further include a step for ventilating an evaporation surface of the aqueous solution, in order to enhance evaporation of the aqueous solution in the cooling step.

The cooling method may further include a dust removing step for preventing adhesion of dust of the air to the evaporation surface.

The cooling method may further include a step for removing solid materials contained in the impurities-containing water or a step for decomposing organic materials contained in the impurities-containing water.

The cooling method may further include a step for adding a biological propagation prevention agent to the aqueous solution.

A value of molar elevation of boiling point of the aqueous solution is increased due to condensation accompanied by the evaporation of the aqueous solution. In dealing with this, the aqueous solution before the condensation may be supplied to a low-temperature part of the evaporation surface. In this case, the aqueous solution flows from the low-temperature part of the evaporation surface of the aqueous solution in the cooling step toward a high-temperature part.

BEST MODE FOR CARRYING OUT THE INVENTION

Figure 1:
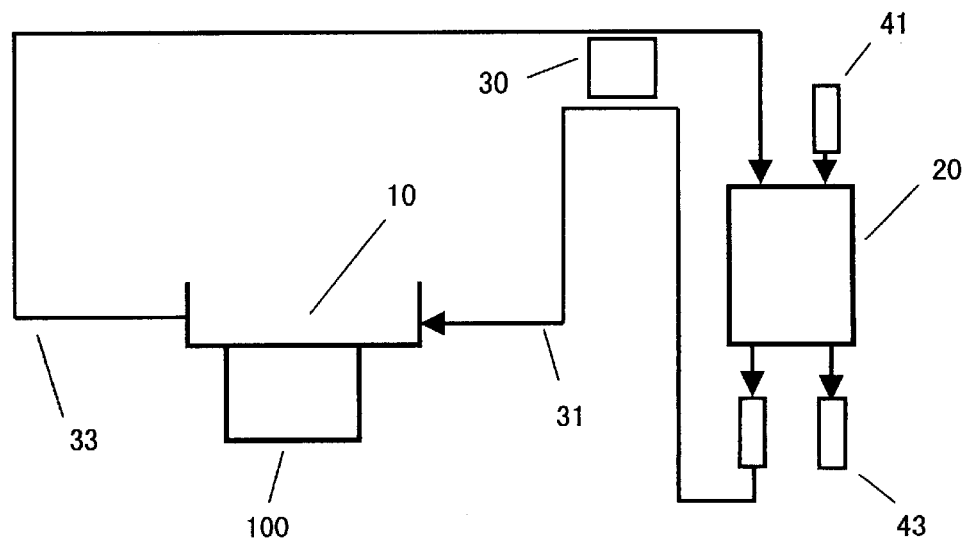
FIG. 1 is a conceptual view illustrating a cooling system according to an embodiment of the present invention.

Referring to accompanying drawings, the present invention is explained for more detailed illustration of the present invention. The same reference numeral designates the same or corresponding part throughout the several views.

FIG. 1 is a conceptual view illustrating a cooling system according to an embodiment of the present invention. In FIG. 1, the cooling system includes an evaporation cooling device 10, a water providing device 20, and a circulation device 30 which circulates aqueous solution between the water providing device 20 and the evaporation cooling device 10.

The circulation device 30 includes supply piping 31 and return piping 33, and circulates the aqueous solution between the evaporation cooling device 10 and the water providing device 20. Water in the aqueous solution is caused to be evaporated at the evaporation cooling device 10. Because latent heat is absorbed by this evaporation of the aqueous solution, the evaporation cooling device 10 cools a high-temperature body 100. Water vapor generated by this evaporation is ejected outside the system.

The aqueous solution concentrated by this evaporation due to loss of water is sent from the evaporation cooling device 10 to the water providing device 20 via the return piping 33.

The water providing device 20 is supplied with impurities-containing water through a supply device 41. In the water providing device 20, the water vapor evaporated from the impurities-containing water is absorbed in the aqueous solution. The aqueous solution which is caused to recover water by the absorption of water vapor is again sent to the evaporation cooling device 10 via the supply piping

31. Continuous evaporation cooling is thereby performed. The impurities-containing water concentrated in the water providing device 20 due to loss of water is drained outside the system by a draining device 43.

The water providing device 20 includes an absorption heat pump. In this case, the aqueous solution includes solute and water as a solvent. Therefore, the aqueous solution has a boiling point higher than that of the pure water. The solute is a non-volatile material, and a concentration of the solute is adjusted so that a value of molar elevation of boiling point of the aqueous solution exceeds the value of molar elevation of boiling point of the impurities-containing water. As the solute, a material having high-solubility; such as sodium chloride, sodium magnesium, sodium calcium, lithium bromide, ammonium chloride, and so forth, may be used.

Figure 2:
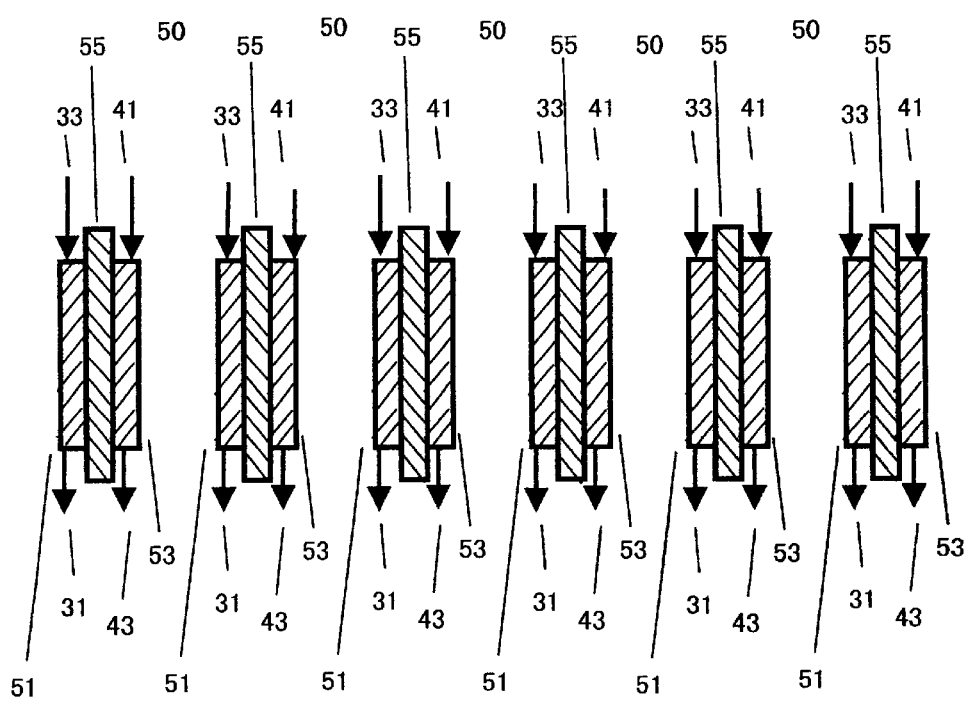
FIG. 2 is a conceptual view illustrating a part of a section of a plurality of absorption heat pumps arranged inside a water providing device used in the cooling system illustrated in FIG. 1.

Inside the water providing device 20 illustrated in FIG. 1, a plurality of absorption heat pumps are arranged in series. FIG. 2 is a conceptual view illustrating a part of the serial arrangement. The number of units of the absorption heat pumps 50 in the arrangement is optional. The arrangement may be arranged along a straight line. Alternatively, it maybe arranged along a closed line.

One unit of the plurality of absorption heat pumps 50 includes a high temperature heat source 51 which is supplied with the aqueous solution and a refrigeration source 53 which is supplied with the impurities-containing water. The high temperature heat source 51 and the refrigeration source 53 are disposed opposite each other via a gap, in which the water vapor evaporated from the impurities-containing water existing at the refrigeration source 53 is diffused toward the high temperature heat source 51, and is absorbed in the aqueous solution existing at the high temperature heat source 51. Latent heat is released accompanied by condensation of the water vapor at the high temperature heat source 51, the latent heat accompanied by the evaporation of water is derived from the refrigeration source 53. There is a heat conducting plate 55 between each high temperature heat source 51 in the arrangement and the refrigeration source 53 of the adjacent absorption heat pump, which improves heat transmittance between the high temperature heat source 51 and the refrigeration source 53 of the adjacent heat pump 50. Namely, the heat released from the high temperature heat source 51 in the arrangement is caused to be absorbed in the adjacent refrigeration source via the heat conducting plate 55. In FIG. 2, this thermal energy moves from the left to the right. The heat conducting plate 55 has non-permeability, and separates the high temperature heat source 51 and a refrigeration source 53 so that mixing or migration of salts is not caused due to contact of the aqueous solution with the impurities-containing water.

As the high temperature heat source 51 and the refrigeration source 53, a member which permeates the aqueous solution and the impurities-containing water may be used. A kind of material that permeates water or saline water, such as sponge, woven cloth, non-woven cloth, paper, and so forth, may be used. Further, it may be a coating material having a pro-aqueous group, with which the heat conducting plate 55 is coated. Further, any material that permeates water, such as soil or charcoal, may be used. Further, the above permeating member or coating material may be arranged along with an adequate pattern for performing a good thermal transmitting property, for example, a striped pattern.

According to the above-explained operation of the absorption heat pumps 50, the impurities-containing water provides water for the evaporation cooling to the aqueous solution. As the impurities-containing water, seawater, groundwater containing salts, industrial waste water, household waste water, or purified water may be used, for example.

A guide for preferably operating the above-mentioned absorption heat pumps 50 is described as follows.

First, in increasing an amount of water transferred from the impurities-containing water to the aqueous solution, the operation of the absorption heat pump 50 is generally performed near the boiling point of the impurities-containing water at the operational pressure. Therefore, a vacuum system is added for the operation in a vacuum atmosphere at a room temperature. Alternatively, the operational temperature may be raised by heating. In reducing energy consumption for the heating, heat may be exchanged between the aqueous solution and the impurities-containing water flowing into the water providing device 20 and the aqueous solution and the impurities-containing water flowing out therefrom. Because migration of materials through scattered water drops due to boiling is undesirable, the operational conditions are determined taking into account of this.

Second, when thermal conductivity by the heat conducting plate 55 between the high temperature heat source 51 and the refrigeration source 53 is high, the amount of water transferred from the impurities-containing water to the aqueous solution increases.

Third, when a gap-length between the high temperature heat source 51 and the refrigeration source 53 is short, the amount of water transferred from the impurities-containing water to the aqueous solution increases. In this case, because direct contact of the high temperature heat source 51 with the refrigeration source 53 is undesirable, adequate gap maintaining members may preferably be disposed in the gap.

Fourth, when increment of concentration of the drained impurities-containing water is small, the amount of water transferred from the impurities-containing water to the aqueous solution increases. Therefore, supply of the impurities-containing water with an adequate flow-rate and drainage thereof are preferred. In this case, an amount of scale-precipitation at the refrigeration source is greatly reduced.

Fifth, when the concentration of the drained aqueous solution is reduced, the saturation pressure of the aqueous solution increases, and the cooling capacity is improved.

Sixth, flowing out of the water vapor with the direction of the gap-plane, or the direction parallel to the plane of the heat conducting plate 55, reduces efficiency, a shield plate for preventing the flowing out may be disposed in a side part of the gap, if necessary.

Figure 3:
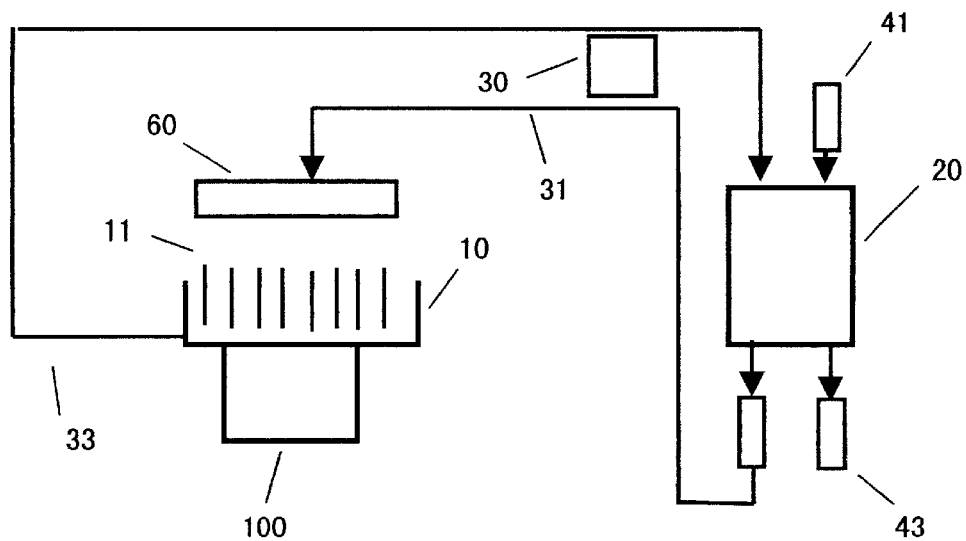
FIG. 3 is a conceptual view illustrating a cooling system according to another embodiment of the present invention.

FIG. 3 is a conceptual view illustrating an evaporation cooling system according to another embodiment of the present invention. In addition to the evaporation cooling system illustrated in FIG. 1, the evaporation cooling system illustrated in FIG. 3 further includes a sprinkler 60 which sprinkles an evaporation surface with the aqueous solution. A plurality of radiator-plates 11 are provided for the evaporation cooling device 10. According to the sprinkler, the cooling capacity of the cooling system is improved.

Figure 4:
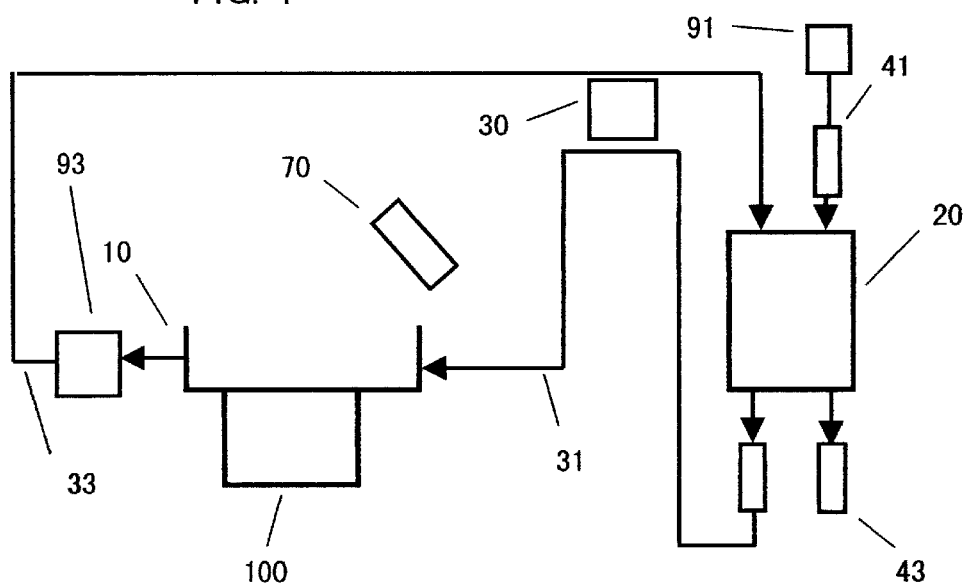
FIG. 4 is a conceptual view illustrating a cooling system according to still another embodiment of the present invention.

FIG. 4 is a conceptual view illustrating an evaporation cooling system according to still another embodiment of the present invention. In addition to the evaporation cooling system illustrated in FIG. 1, the evaporation cooling system illustrated in FIG. 4 further includes a ventilator 70 which ventilates an evaporation surface of the evaporation cooling device 10, a filtration device 91 which removes solid materials contained in the impurities-containing water, and a filtration device 93 which removes solid materials contained in the aqueous solution. Because evaporation is enhanced by the ventilator 70, the cooling capacity of the cooling system is improved. Further, the filtration device 91 and the filtration device 93 prevent sedimentation of solid materials in the water absorbing device 20.

Figure 5:
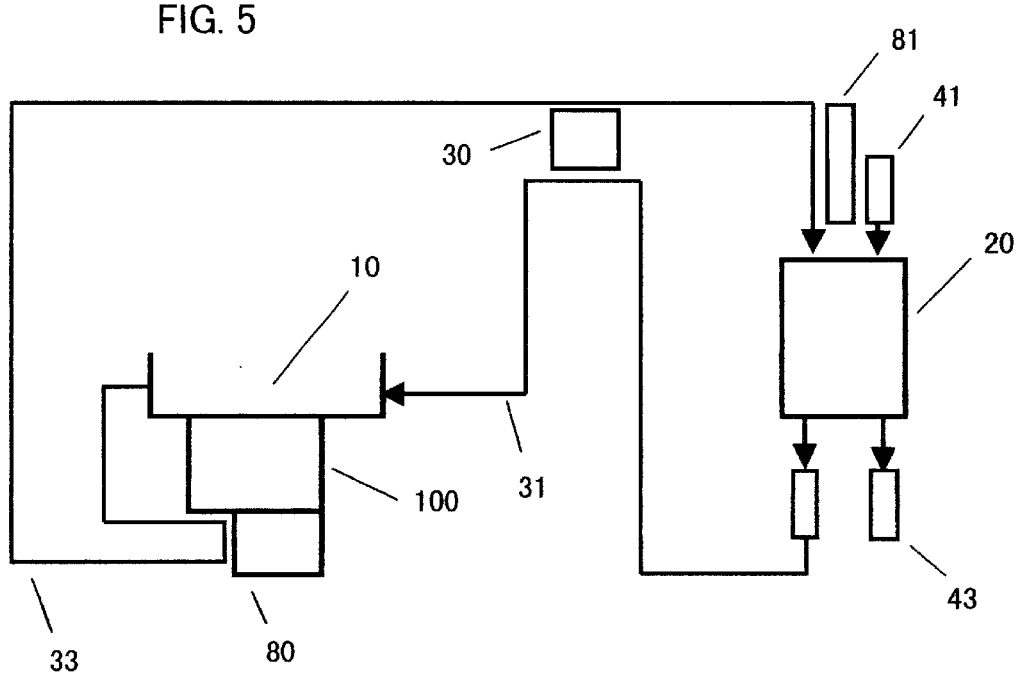
FIG. 5 is a conceptual view illustrating a cooling system according to still another embodiment of the present invention.

FIG. 5 is a conceptual view illustrating an evaporation cooling system according to still another embodiment of the present invention. In addition to the evaporation cooling system illustrated in FIG. 1, the evaporation cooling system illustrated in FIG. 5 further includes a heating device 80 which heats aqueous solution passing through the return piping 33 utilizing heat of the high-temperature body to be cooled. The water providing device 20 includes the absorption heat pump. Further, a heat exchanger 81 which closes temperature difference between impurities-containing water and the aqueous solution is provided for the water providing device 20. Therefore, enhancement of the cooling of a high-temperature body and an amount of diffused water vapor in the above-mentioned absorption heat pump are increased, and the cooling capacity of the evaporation cooling system is improved.

Figure 6:
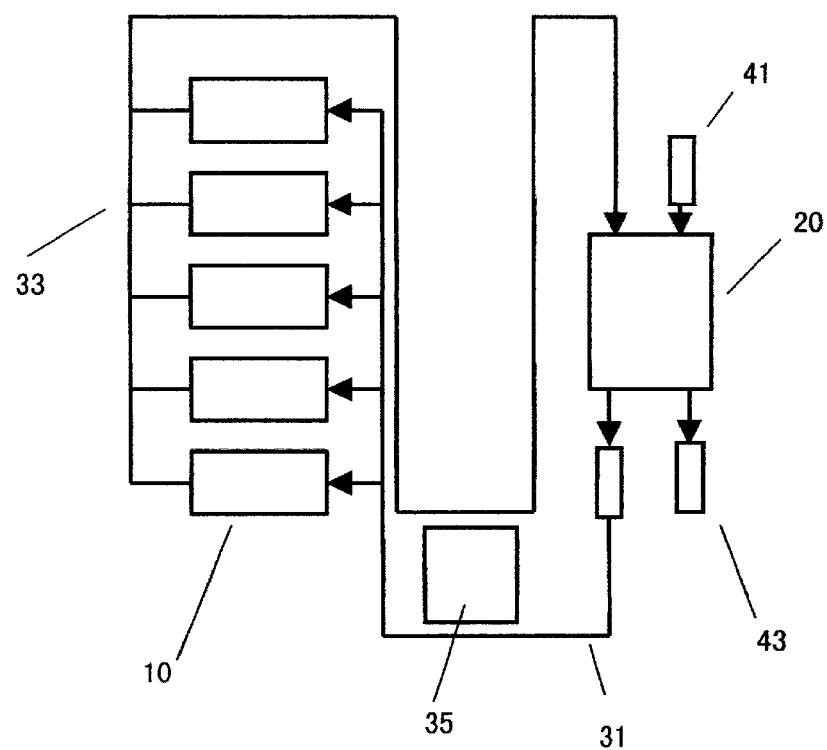
FIG. 6 is a conceptual view illustrating a cooling system according to still another embodiment of the present invention.

FIG. 6 is a conceptual view illustrating an evaporation cooling system according to still another embodiment of the present invention. In FIG. 6, the cooling system includes a plurality of evaporation cooling devices 10, a water providing device 20, and a circulation device 35 which circulates aqueous solution between the water providing device 20 and each of the evaporation cooling devices 10. The circulation device 35 includes supply piping 31 and return piping 33. The water providing device 20 includes a water supplying device 41 and a water draining device 43, and is supplied with impurities-containing water.

Each of the evaporation cooling devices 10 is connected to a heat source of an air conditioner (not shown). Temperature-rise in a region due to a heat-island phenomenon is eased, by disposing the circulation device 35 in a prescribed region, and by connecting it to the air conditioner 10 in the region. Further, because the evaporation cooling efficiently reduces temperature of the high temperature heat source of the air-conditioner 10, saving energy is realized.

Figure 7:
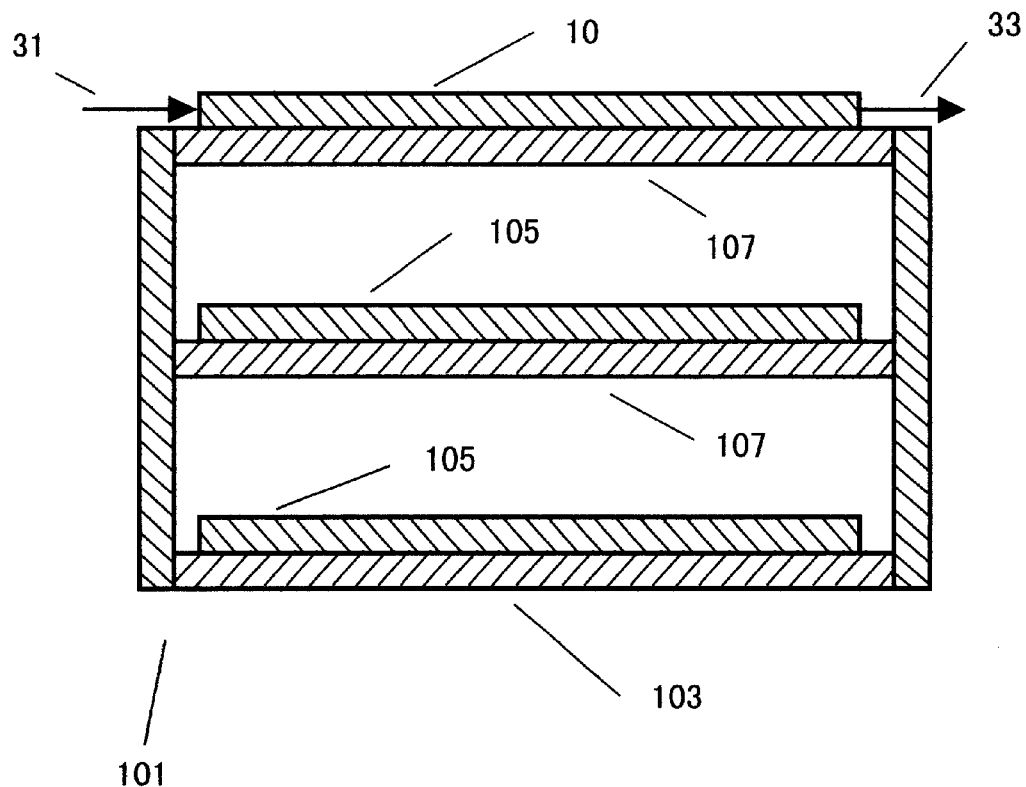
FIG. 7 is a conceptual view illustrating a section of an evaporation cooling device used in a cooling system according to still another embodiment of the present invention.

FIG. 7 is a conceptual view illustrating a section of an evaporation cooling device which is used in a cooling system according to still another embodiment of the present invention. In FIG. 7, the evaporation cooling device 10 is connected to a multi-effect distillation device 101. The multi-effect distillation device includes a heat absorbing surface 103, a solution-permeating member 105, and a condensation surface 107. The heat absorbing surface 103 absorbs atmospheric thermal energy and/or solar radiation. The solution-permeating member 105 is supplied with solution to be distilled.

The evaporation cooling device 10 and the multi-effect distillation device 101 are installed in the atmosphere. When humidity of the atmosphere is low, the temperature of the evaporation cooling device is caused to be lower than the temperature of the atmosphere. Therefore, the multi-effect distillation device 101 can distill the solution even if the solar radiation is not incident thereon. As the solution, the aqueous solution may be used. In this case, distilled water is obtained.

Hereinafter, an exemplary operation of the cooling system is explained.

This exemplary operation is made for illustrating the cooling system and the cooling method more concretely, and is not described for limiting the cooling system and the cooling method according to the present invention.

The exemplary operational condition, which is explained as follows, is the operational condition in the cooling system illustrated in FIG. 1. As the water providing device 20, the plurality of absorption heat pumps 50 having the structure illustrated in FIG. 2 are used. Aluminum having a plate-thickness of 1 mm, in which corrosion resistance is improved by anode oxidation, is used as the heat conducting plate 55. As the material for the high temperature heat source and the refrigeration source, thin cloth is used as the permeating body. The distance between the high temperature heat source and the refrigeration source is set to be 5 mm.

An arrangement of one block is constituted by serially arranging 1000 units of absorption heat pumps 50. The water providing device 20 includes a vacuum container having an evacuation system. Ten blocks of the arrangement of the absorption heat pumps are disposed in the vacuum container for the water providing device 20. By a heat transmitting means consisting of another aluminum plate treated with the anode oxidation treatment, a high temperature heat source at an edge portion of the block is thermally connected to a refrigeration source of the adjacent block. A content of the vacuum container is 100 m$^3$.

Seawater is used as the impurities-containing water. A value of molar elevation of boiling point of the seawater is about 0.5° C. Sodium chloride solution is used as the aqueous solution. A value of molar elevation of boiling point of the aqueous solution supplied to the water providing device 20 is set at 2.5° C. When a temperature of the seawater is below the temperature of the sodium chloride solution, a heat exchanging step is performed in advance so that the temperature difference is cause to be reduced. An operational pressure of the water providing device 20 is set near the saturated vapor pressure of the seawater at the operational temperature.

An amount of the aqueous solution supply is set so that a value of molar elevation of boiling point of the sodium chloride solution drained from the water providing device 20 is caused to be 1° C. An amount of the seawater supply is set so that a value of molar elevation of boiling point of the seawater drained from the water providing device is caused to be 0.6° C. When the value of molar elevation of boiling point of the seawater drained from the water providing device is high, namely, when the seawater is highly concentrated, an amount of scale precipitation in the water providing device increases. If the scale is generated in the water providing device, it is appropriately removed.

In the evaporation cooling device, the scale precipitation is greatly reduced.

In reducing the present invention into practice, which is explained in detail in the above, an additional step may be performed for preferably performing he cooling method according to the present invention. For example, it is an oil-removing treatment, or removal of volatile elements and resolved gas and so forth. Further, a sterilizing treatment such as an ozone treatment or an addition of chlorine may be performed. An antifungal treatment may be performed for the permeating member and so forth.

Besides, the present invention may be reduced into practice accompanying a supplementary means for preferably operating the cooling system and the cooling method according to the present invention, for example, coating for improving corrosion resistance, a surface treatment, a temperature sensor, monitoring of salts concentration, and so forth.

Accordingly, the present invention disclosed herein provides a novel cooling system and a cooling method, wherein in view of the teachings disclosed in the above-mentioned detailed explanation, a practice of the present invention is not limited to the above-mentioned examples for explaining the preferred embodiments of the present invention, and wherein the present invention may be practiced as other embodiments with variations within the scope of the claims as follows or may be practiced without supplementary forms or elements which are appended for explaining the preferred embodiments.

Industrial Applicability

According to the cooling system and the cooling method of the present invention, a cooling system is realized, wherein there are no problems which arise from the scale. Further, because the cooling is efficiently performed, the cooling having reduced energy consumption is realized. The present invention is reduced into practice for a system such as a saline water desalination system, a generation system, an internal combustion engine, or a heat pump, in which the cooling by evaporation of water is performed.

What is claimed is:

1. A cooling system, comprising:
   an evaporation cooling device for evaporating an aqueous solution having a boiling point higher than that of an impurities-containing water;
   a water providing device which causes water vapor evaporated from the impurities-containing water to be absorbed in the aqueous solution,
   a circulation device which circulates the aqueous solution between the water providing device and the evaporation cooling device; and
   a distillation device having a condensation part, wherein the evaporation cooling device is disposed at the condensation part.

2. The cooling system according to claim 1, wherein the aqueous solution includes a sodium chloride as a solute.

3. The cooling system according to claim 1, wherein the aqueous solution includes a sodium magnesium as a solute.

4. The cooling system according to claim 1, wherein the aqueous solution includes a sodium calcium as a solute.

5. The cooling system according to claim 1, further comprising a permeating member for the aqueous solution.

6. The cooling system according to claim 1, further comprising a sprinkler which sprinkles the aqueous solution.

7. The cooling system according to claim 1, further comprising a ventilator for enhancing the evaporation.

8. The cooling system according to claim 1, further comprising a chimney which is used for generating an updraft for enhancing the evaporation.

9. The cooling system according to claim 1, further comprising a dust-prevention device.

10. The cooling system according to claim 1, wherein the water providing device is an absorption heat pump which is supplied with the impurities-containing water and the aqueous solution.

11. The cooling system according to claim 10, further comprising a heating device for operating absorption heat pump in a high-temperature atmosphere.

12. The cooling system according to claim 10, further comprising a vacuum device for operating the absorption heat pump in a vacuum atmosphere.

13. The cooling system according to claim 1, further comprising a filtration device for removing a solid material contained in the impurities-containing water.

14. The cooling system according to claim 1, further comprising a water processing device for decomposing an organic material contained in the impurities-containing water.

15. The cooling system according to claim 1, further comprising a distillation device having a condensation part, wherein the evaporation cooling device is disposed at the condensation part.

16. The cooling system according to claim 1, wherein the distillation device further includes a heat-absorbing surface for absorbing a thermal energy of the atmosphere.

17. The cooling system according to claim 1, wherein the distillation device is supplied with a solar thermal energy.

18. The cooling system according to claim 1, further comprising a steam power generating system having a condenser, wherein the evaporation cooling device is dispose at the condenser.

19. The cooling system according to claim 1, further comprising an internal combustion engine, wherein the evaporation cooling device is disposed at the internal combustion engine.

20. The cooling system according to claim 1, further comprising a air-conditioner having a high temperature heat source, wherein the evaporation cooling device is disposed as the high temperature heat source.

21. The cooling system according to claim 20, wherein the evaporation cooling device is plural.

22. A cooling method, comprising:
a step for taking an impurities-containing water;
a step for cooling a high-temperature body by evaporating water of an aqueous solution which has a boiling point higher than that of the impurities-containing water;
a step for causing the water vapor evaporated from the impurities-containing water to be absorbed in the aqueous solution that is concentrated by the cooling step;
a step for sending the aqueous solution diluted by the absorption step to the cooling step;
a step for draining the impurities-containing water concentrated by the absorption step, and
a step for preventing an adhesion of dust of the air.

23. The cooling system according to claim 22, wherein the absorption step is performed by an absorption heat pump which is supplied with the impurities-containing water and the aqueous solution.

24. The cooling method according to claim 23, further comprising a vacuum evacuating step for operating the absorption heat pump in a vacuum atmosphere.

25. The cooling system according to claim 22, further comprising a step for ventilating an evaporation surface of the aqueous solution.

26. The cooling system according to claim 22, further comprising a step for preventing an adhesion of dust of the air.

27. The cooling system according to claim 22, wherein a biological propagation prevention agent is added to the aqueous solution.

28. The cooling system according to claim 22, further comprising a step for removing a solid material contained in the impurities-containing water.

29. The cooling system according to claim 22, further comprising a step for decomposing an organic material contained in the impurities-containing water.

30. The cooling system according to claim 22, wherein the aqueous solution in the cooling step flows from a low temperature part of an evaporation surface of the aqueous solution to a high temperature part.

31. A cooling system, comprising:
an evaporation cooling device for evaporating an aqueous solution having a boiling point higher than that of an impurities-containing water;
a water providing device which causes water vapor evaporated from the impurities-containing water to be absorbed in the aqueous solution;
a circulation device which circulates the aqueous solution between the water providing device and the evaporation cooling device, and
a chimney which is used for generating an updraft for enhancing the evaporation.

32. A cooling system, comprising:
an evaporation cooling device for evaporating an aqueous solution having a boiling point higher than that of an impurities-containing water;
a water providing device which causes water vapor evaporated from the impurities-containing water to be absorbed in the aqueous solution;
a circulation device which circulates the aqueous solution between the water providing device and the evaporation cooling device, and
a dust-prevention device.

* * * * *